Sept. 11, 1934. A. J. OLSON 1,973,502
CABLE CLAMP
Filed March 12, 1934 2 Sheets-Sheet 2
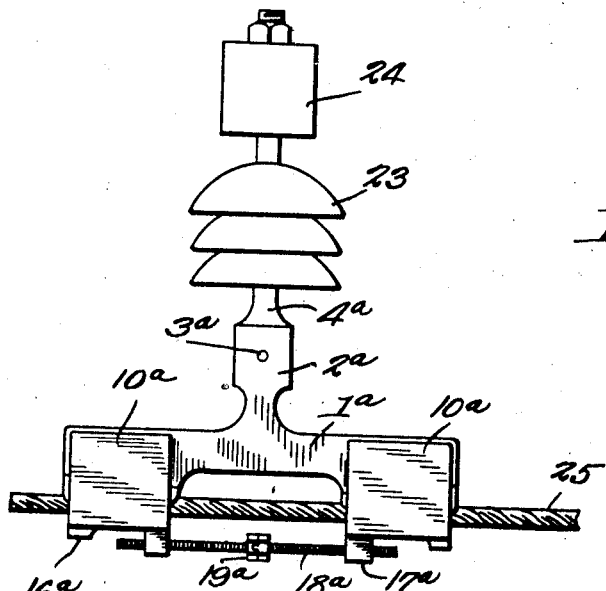
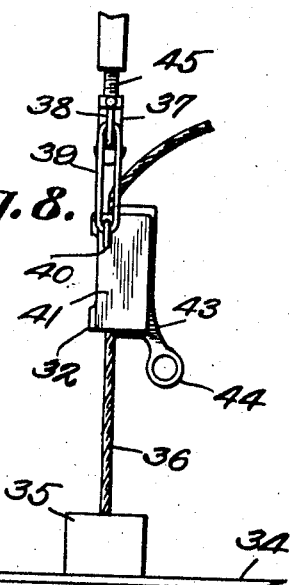
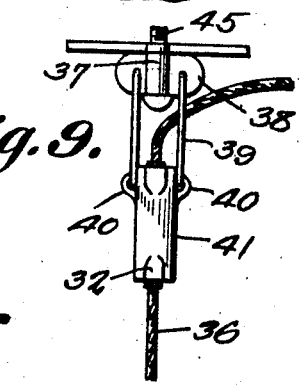
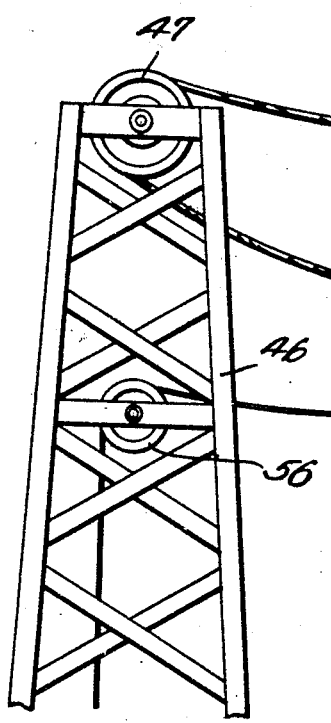
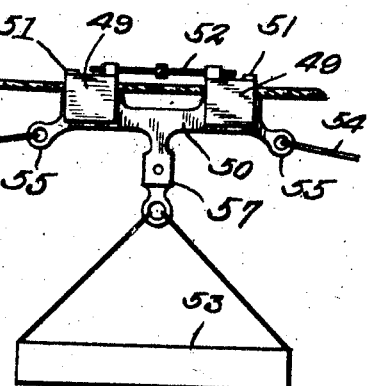
A. J. Olson Inventor Patented Sept. 11, 1934

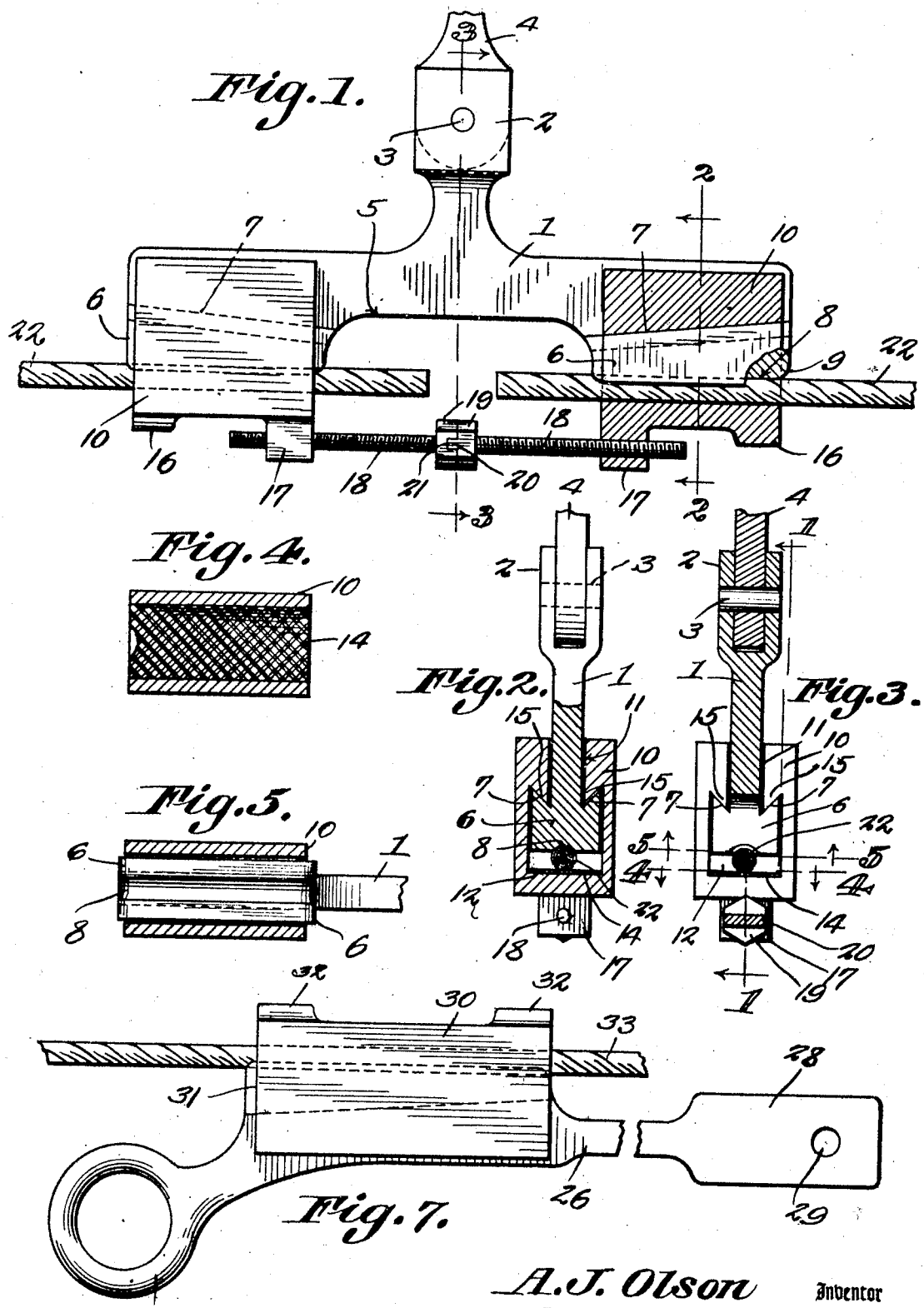
Sept. 11, 1934.  A. J. OLSON  1,973,502
CABLE CLAMP
Filed March 12, 1934   2 Sheets-Sheet 1

1,973,502

UNITED STATES PATENT OFFICE 1,973,502

CABLE CLAMP

Anton J. Olson, Pomona, Calif.

Application March 12, 1934, Serial No. 715,240

7 Claims. (Cl. 24—136)

This invention aims to provide a simple but effective means for gripping a cable or cables, the mechanism being capable of a wide variety of uses, certain of which will be explained, by way of example, hereinafter.

It is within the province of the disclosure to improve generally and to enhance the utility of devices of that type to which the invention pertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a device constructed in accordance with the invention;

Fig. 2 is a section on the line 2—2 of Fig. 1;

Fig. 3 is a section on the line 3—3 of Fig. 1;

Fig. 4 is a section on the line 4—4 of Fig. 3;

Fig. 5 is a section on the line 5—5 of Fig. 3;

Fig. 6 is an elevation showing the invention applied for the support of a high tension electric cable;

Fig. 7 is a side elevation showing a simplified form of the invention, parts being broken away;

Fig. 8 is an elevation showing the device as it may be used in connection with well mechanisms;

Fig. 9 is an elevation wherein the structure of Fig. 8 is viewed at right angles to the showing of Fig. 8;

Fig. 10 is an elevation showing the device applied to a conveyor mechanism.

In carrying out the invention, as shown in Figs. 1, 2, 3, 4 and 5, there is provided a body 1, which may be equipped, intermediate its ends with an upstanding fork 2 carrying a transverse pivot element 3, on which is mounted a supporting member 4. There is a recess 5 in the lower edge of the body 1, located about midway between the ends of the body. The ends of the body 1 carry laterally enlarged depending feet 6, the upper edges of which are marked by the numeral 7. These edges 7 slant inwardly toward the median longitudinal plane of the body 1, and also slant toward each other, longitudinally of the body. In the lower edges of the feet 6 there are smooth longitudinal grooves 8. The feet 6 are rounded as shown at 9, at the ends of the grooves 8, to avoid fraying the cables which are to be held.

U-shaped jaws 10 are provided and are slidable longitudinally of the body 1. The jaws 10 are supplied with slots 11 which receive the body 1 closely, as shown in Figs. 2 and 3, and below the slots 11, the jaws are supplied with enlarged recesses 12. The base of each jaw 10, within the recess 12 is disposed at an acute angle to the edges 7 of the feet 6 of the body 1, and the base of each jaw is roughened, as shown at 14. In their upper portions, the jaws 10 have overhanging flanges 15 which cooperate slidably with the edges 7 of the feet 6 of the body 1, the jaws, thus, being mounted on the body 1 for longitudinal sliding movement, toward and away from each other. On their outer ends, the jaws 10 have depending hammer lugs 16. On their inner ends, the jaws 10 have depending lugs 17, into which screws 18 are oppositely threaded. The screws 18 are supplied at their inner ends with polygonal heads 19, adapted to receive a wrench or other tool (not shown). One of the heads 19, on its inner surface, is supplied with a tongue 20, adapted to be received in a seat 21 in the other head.

Assuming that a pair of cable ends 22 are to be held, the cable ends 22 are inserted into grooves 8 of the feet 6, within the recesses 12 of the jaws 10. The jaws 10 are driven toward each other, by hammer blows on the lugs 16, the heads 19 of the screws 18 being spaced apart. By this driving operation, the bases 14 of the jaws are spaced vertically from the seats 8 in the feet 6 of the body 1, so that the ends of the cables 22 may be inserted readily between the parts 14 and 8. Owing to the fact that the upper edges 7 of the feet 6 slant toward each other, longitudinally of the body, it will be obvious that the cable ends 22 will be gripped firmly in the grooves 8, by contact with the roughened surfaces 14 of the jaws 10 when the jaws are moved away from each other. The screws 18 are rotated until the tongue 20 is engaged in the seat 21, a wrench (not shown) may be applied to the heads 19, and the jaws 10 may be moved longitudinally of the body 1, to cause the jaws to grip the cable ends as tightly as is desired.

In Fig. 6, parts hereinbefore described have been designated by numerals previously used, with the suffix "a". In this form of the invention, the suspension member 4a carries insulators 23, or is connected to the insulators, the cross arm being marked by the numeral 24. The device as shown in Fig. 6 is adapted to carry a high voltage conductor 25.

In Fig. 7 a simplified form of the invention is shown. In this figure, the body is designated 110 by the numeral 26 and has an eye 27 at one end. The opposite end of the body 26 is flattened as shown at 28 and has an opening 29. The slidable jaw is shown at 30. The jaw 30 is connected to the body 26, as indicated at 31, by the construction shown at 15—7 in Figs. 2 and 3. At its ends, the jaw 30 has upstanding hammer lugs 32.

The operation of the device shown in Fig. 7 will be understood readily from what has been stated hereinbefore in connection with the form shown in Fig. 1. It will be obvious that when relative movement in the proper direction is brought about between the body 26 and the jaw 30, the cable 33 will be gripped the more tightly, by the cooperation between the jaw 30 and the body 26.

In Figs. 8 and 9, a structure is shown wherein the device is adapted for use in connection with a walking beam (not shown) of a well mechanism. In this form of the invention, the floor of the rig is shown at 34, and the tubing is indicated at 35. The table appears at 36 and is attached by the device forming the subject matter of this application to the mechanism 37 that is carried by the temper screw 45, the said mechanism sometimes including ears 38 to which are pivoted links 39, the links 39 being pivotally connected at 40 with the jaw 41, the jaw 41 having hammer lugs 32 at its ends, and the slidable body being shown at 43, the body 43 corresponding to the body 26 of Fig. 7 and having the eye 44. The connection between the body 43 and the jaw 41 is of the kind shown in Figs. 2 and 3 and, obviously, grips the cable 36 tightly.

Figure 10 shows an application of the invention wherein the device is used in connection with a carrier movable across a gulch, river or the like. One of the towers is shown at 46. The towers 46 have sheaves 47 about which the carrying-cable 48 is looped. The lower run of the cable 48 is gripped between the jaws 49 and the body 50, which are constructed as set forth hereinbefore, and as shown in Figs. 1 to 5 of the drawings. The hammer lugs appear at 51. The screws 52 correspond to the screws 18 of Fig. 1. The hauling lines 54 are connected to eyes 55 on the ends of the body 50, and are passed over sheaves 56 on the towers 46. The sling 53 is suspended at 57 from the body 50 by a mechanism corresponding to that shown at 2—4 in Fig. 1, but inverted.

There are many other applications of the invention, but it is not possible or desirable to show all of them. It will be understood that changes falling within the skill of a mechanic may be made wherever necessary, no drawing being required to show that hooks or the like may be substituted for eyes, wherever convenient. The general construction of the device is such that it will grip a line securely, grip being increased with the tension to which the device is subjected.

Having thus described the invention, what is claimed is:

1. In a device of the class described, a body having an enlarged foot, the upper lateral edges of which slant longitudinally of the body, and a jaw slidable longitudinally of the body on said edges of the foot, the jaw having a recess receiving the foot, the jaw having a reduced slot receiving the body, the inner surfaces of the foot and of the jaw having coacting means for gripping an object upon relative longitudinal movement between the jaw and the body.

2. In a device of the class described, a body having an enlarged foot, the upper edges of which slant transversely toward the median plane of the body, the said edges slanting longitudinally of the body, and a jaw having flanges which engage with the upper edges of the foot and correspond to the transverse slant of said edges of the foot, the jaw being slidable longitudinally of the body on said edges of the foot, the jaw having a recess receiving the foot, and the jaw having a reduced slot receiving the body, the inner surfaces of the foot and of the jaw having cooperating means for gripping an object, upon relative longitudinal movement between the jaw and the body.

3. A device of the class described, constructed as set forth in claim 1, and wherein the lower surface of the foot is provided with a groove for receiving the object to be gripped, the foot being rounded at the ends of the groove to prevent fraying, and the bottom of the clamp being roughened to enhance the hold thereof on the object to be gripped.

4. A device of the class described, constructed as set forth in claim 1, and wherein the jaw is provided with a transversely extended, outstanding hammer lug, located adjacent to the end of the jaw.

5. A device of the class described, comprising a body and jaws slidable on the ends of the body, the body and the jaws having cooperating inclined elements which move the jaws transversely of the body and cause them to grip an object, when the jaws are moved longitudinally of the body, screws threaded in opposite directions in the jaws, and detachably interengageable elements on the inner ends of the screws.

6. A device of the class described comprising a body, jaws slidable longitudinally of the body, the jaws and the body having relatively inclined parts which move the jaws transversely of the body upon movement of the jaws longitudinally of the body, and screws threaded in opposite directions into the jaws, the inner end of one screw being provided with a tongue, and the inner end of the other screw being provided with a seat, adapted to receive the tongue, the tongue and the seat constituting interengaging elements for connecting the screws for rotation as one piece.

7. A device of the class described comprising a body, jaws slidable longitudinally of the body, the jaws and the body having relatively inclined parts which move the jaws transversely of the body upon movement of the jaws longitudinally of the body, screws threaded in opposite directions into the jaws, heads on the inner ends of the screws, the heads of the screws being shaped so that they may be engaged simultaneously by a wrench or similar tool, and the heads of the screws having elements forming a releasable connection between the screws, when the heads are brought together.

ANTON J. OLSON.